(12) United States Patent
Miura et al.

(10) Patent No.: US 7,471,902 B2
(45) Date of Patent: Dec. 30, 2008

(54) WAVELENGTH ALLOCATION METHOD OF SIGNAL LIGHT, AND OPTICAL TRANSMISSION APPARATUS AND WAVELENGTH DIVISION MULTIPLEXING OPTICAL TRANSMISSION SYSTEM USING THE METHOD

(75) Inventors: Akira Miura, Kawasaki (JP); Takao Naito, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 684 days.

(21) Appl. No.: 10/723,437

(22) Filed: Nov. 26, 2003

(65) Prior Publication Data

US 2004/0190903 A1    Sep. 30, 2004

(30) Foreign Application Priority Data

Nov. 26, 2002    (JP)    ............... 2002-341962

(51) Int. Cl.
*H04J 14/02* (2006.01)
*H04J 14/00* (2006.01)

(52) U.S. Cl. ............... 398/79; 398/82; 398/43
(58) Field of Classification Search ............... 398/79, 398/43, 42, 68, 69, 82
See application file for complete search history.

(56) References Cited

U.S. PATENT DOCUMENTS

| | | | | |
|---|---|---|---|---|
| 5,943,151 | A * | 8/1999 | Grasso et al. | ............... 398/147 |
| 6,459,515 | B1 * | 10/2002 | Bergano | ............... 398/79 |
| 7,039,270 | B2 * | 5/2006 | Poti et al. | ............... 385/24 |
| 2002/0105715 | A1 | 8/2002 | Naito et al. | ............... 359/334 |
| 2002/0114061 | A1 | 8/2002 | Naito et al. | ............... 359/334 |
| 2003/0011874 | A1 | 1/2003 | Nakamoto et al. | ............... 359/334 |

FOREIGN PATENT DOCUMENTS

| | | |
|---|---|---|
| JP | 2002-196379 | 7/2002 |
| JP | 2002-229084 | 8/2002 |
| JP | 2003-32193 | 1/2003 |

(Continued)

OTHER PUBLICATIONS

F. Forghieri, et al., "Reduction Of Four-Wave Mixing Crosstalk In WDM Systems Using Unequally Spaced Channels," IEEE Photon, Technol. Lett., vol. 6, pp. 754-756, Jun. 1994.

(Continued)

*Primary Examiner*—M. R. Sedighian
(74) *Attorney, Agent, or Firm*—Staas & Halsey LLP

(57) ABSTRACT

An object of the invention is to provide a wavelength allocation method of signal light, which is capable of consecutively allocating signal lights efficiently on wavelength grids, while suppressing degradation in transmission characteristic due to the generation of four-wave mixed light in an optical transmission path. To this end, according to the wavelength allocation method of signal light, the consecutive allocation wavelength number of signal lights to be allocated consecutively on the wavelength grids, is set to different values according to wavelength bands, based on wavelength dependence of a generation amount of four-wave mixed light on the optical transmission path, and the signal lights are allocated consecutively on the wavelength grids in accordance with this consecutive allocation wavelength number, but the signal light is not allocated on at bas one wavelength grid adjacent to the wavelength grids on which a group or signal light are allocated consecutively.

10 Claims, 13 Drawing Sheets

SUMMARY OF WAVELENGTH ALLOCATION OF SIGNAL LIGHT
ACCORDING TO PRESENT INVENTION

FOREIGN PATENT DOCUMENTS

WO           02/15450           2/2002

OTHER PUBLICATIONS

I Haxell, et al., "52×12.3 Gbit/s DWDM Transmission Over 3600km of True Wave Fiber With 100km amplifier Spans," PD5, OAA 2000.

Xiang-Dong Cao, et al., "Ultra Long-haul DWDM Transmission Via Nonlinearity Management," OtuC5, pp. 140-142, OAA 1999.

Bergano, et al., "320Gb/s WDM Transmission (64×5Gb/s) over 7,200km Using Large Mode Fiber Spans and Chirped Returned-to-Zero Signals," OFC'98, postdeadline papers PD12, San Jose, USA, Feb. 1998.

European Search Report in corresponding Patent Application No. 03026929.4-2415 dated Mar. 9, 2006.

Katagiri T et al., Optical Society of America/Institute of Electrical and Electronics Engineers: "FWM Crosstalk Suppression Using Wavelength Groupimg in 25-GHz-spaced 10 Gbps-based WDM Transmission over NZ-DSF in C-band", Optical Fiber Communication Conference, (OFC)., PostConference Digest, Atlanta, GA, Mar. 23-28, 2003, Trends in Optics and Photonics Series (TOPS), Washington, DC: OSA, U.S., vol. TOPS. vol. 86, Mar. 23, 2003, pp. 664-665.

\* cited by examiner

EXAMPLE OF NZ-DSF WAVELENGTH
DISPERSION CHARACTERISTIC

FIG.10
(A)
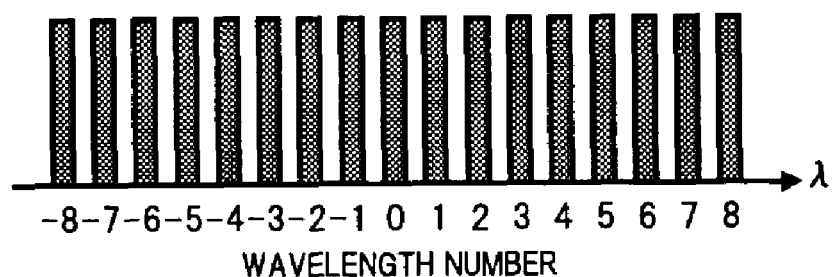
(B)
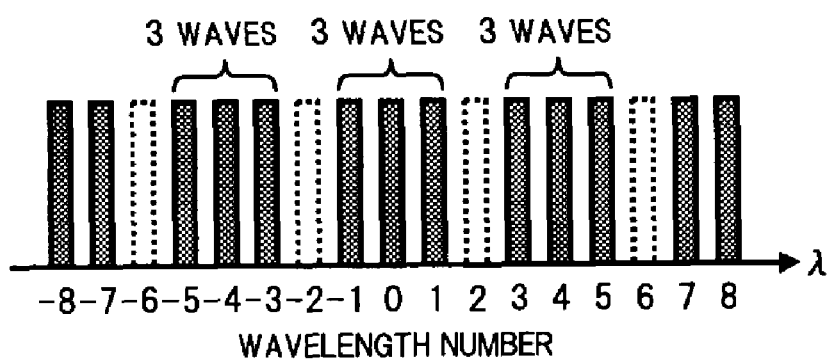
(C)
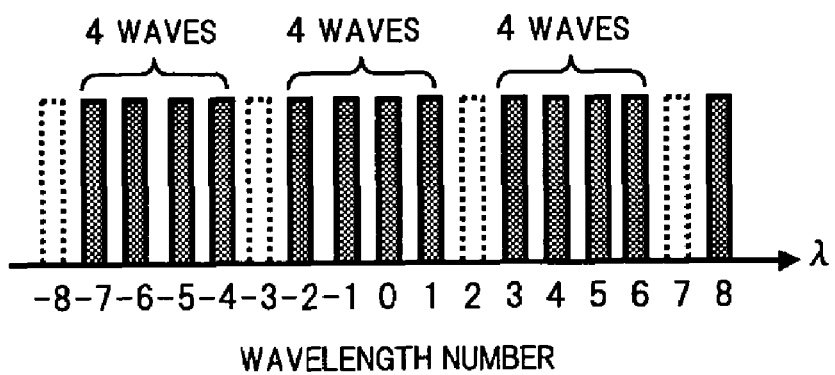

EXAMPLE OF CONVENTIONAL SIGNAL LIGHT WAVELENGTH ALLOCATION (6,2) WAVELENGTH GROUPS

WAVELENGTH ALLOCATION METHOD OF SIGNAL LIGHT, AND OPTICAL TRANSMISSION APPARATUS AND WAVELENGTH DIVISION MULTIPLEXING OPTICAL TRANSMISSION SYSTEM USING THE METHOD

BACKGROUND OF THE INVENTION

1. Field of the Invention

The present invention relates to a wavelength allocation method of signal light on wavelength grid in a wavelength division multiplexing optical transmission, and in particular, relates to a wavelength allocation method for signal light, which can suppress transmission characteristic degradation caused by four-wave mixed light generated in an optical transmission path, and an optical transmission apparatus and a wavelength division multiplexing optical transmission system using the method.

2. Description of the Related Art

Due to the tremendous increase in IP traffic, the demand for large capacity and low cost optical transmission systems has increased rapidly. To meet this requirement, one solution is to further increase the capacity and lower the cost of wavelength division multiplexing (WDM) optical transmission systems. Dense wavelength division multiplexing, in which spacing between wavelengths is reduced, is considered as means for increasing WDM capacity.

FIG. 12 shows an example of a typical WDM optical transmission system.

The WDM optical transmission system shown in FIG. 12 comprises, for example, an optical transmission terminal apparatus 1, optical repeater apparatuses 2, an optical reception terminal apparatus 3, and an optical transmission path 4. The optical transmission terminal apparatus 1 comprise: optical senders (OS) 1A for each wavelength; variable optical attenuators (VOA) 1B adjusting the levels of signal lights output from the optical senders 1A, for each wavelength; an optical multiplexer (MUX) 1C multiplexing the signal lights of respective wavelengths to output a WDM signal light, and a post-amplifier 1D amplifying the WDM signal light directly in optical to send the amplified signal to the optical transmission path 4. A part of the WDM signal light output from the post-amplifier 1D may be sent to an optical spectrum analyzer (OSA) 1E, and a transmission state thereof may be monitored.

The optical reception terminal apparatus 3 comprises: a preamplifier 3A receiving and amplifying the WDM signal light repeatedly transmitted from the optical transmission terminal apparatus 1 via the optical transmission path 4 and the optical repeating apparatuses 2; an optical demultiplexer (DEMUX) 3B demultiplexing the WDM signal light amplified by the preamplifier 3A into signal lights of respective wavelengths; and optical receivers 3C receiving the signal lights. A part of the WDM signal light received by the preamplifier 3A may by sent to an optical spectrum analyzer (OSA) 3D, and a reception state thereof may be monitored.

As the optical repeater apparatus 2, there is for example an optical amplification-repeating apparatus comprising only an optical amplifier for amplifying the WDM signal light having been attenuated in the optical transmission path 4. As another example of the optical repeater apparatus 2, there is an optical repeater apparatus which operates not only as an optical amplifier, but also as an OADM (Optical Add/Drop Multiplexing) node having an optical add/drop multiplexing function, or as an optical compensation node having functions for compensating for accumulation of optical level deviations between wavelengths, which is a particular problem in the transmission over long distance, and for compensating for wavelength dependence of cumulative dispersion attributable to a difference in dispersion slope rate between the transmission path and a dispersion compensator compensating for wavelength dispersion in the transmission path. For the OADM nodes or optical compensation nodes, there have been known a method in which the optical add/drop multiplexing, the optical level deviation compensation, and the dispersion slope compensation are performed for each individual wavelength, or a method in which signal lights of a plurality of wavelengths are grouped into a single wavelength group to form a plurality of wavelength groups, and the optical add/drop multiplexing, the optical level deviation compensation and the dispersion slope compensation are performed for each of the respective wavelength groups.

FIG. 13 shows an example of wavelength allocation of signal lights, in the case where the aforementioned wavelength groups are applied.

In the wavelength allocation shown in FIG. 13, a band of 8 wavelengths comprising a signal band in which signal lights of six consecutive waves are present, and a wavelength protection band for two wavelengths, in which signal lights are not present, is set as a single wavelength group. Here, such a wavelength group comprising signal lights of q consecutive waves and a wavelength protection band for r wavelengths, is called a (q, r) wavelength group. The example In FIG. 13 shows (6, 2) wavelength groups. In such a (q, r) wavelength group, due to the presence of the wavelength protection band, the wavelength spacing becomes wider in some parts of the overall signal band. Therefore, there is an effect that an influence of non-linear effect occurring in the optical transmission path is reduced. Here, the wavelength protection band has a value depending on a transmission characteristic of a multiplexer/demultiplexer used in the OADM node or the optical compensation node.

In such a conventional WDM optical transmission system, by using about 0.4 nm wavelength spacing (50 GHz spacing), and both the 1550 nm band (C-band) and the 1580 nm band (L-band) as signal wavelength bands, the transmission in 160 or more or wavelength multiplexing and 1.6 Tb/s or more of transmission capacity, is realized. Moreover, in order to cope with the expected further rapid increase in traffic, development or super dense multiplexing for increasing the signal light wavelength band and further reducing the width of the signal light wavelength spacing is anticipated.

To be specific, assuming the case where the 50 GHz spacing currently implemented as the wavelength spacing between signal lights is halved to 25 GHz spacing, a problem occurs in that waveform distortion due to the non-linear effect in an optical fiber is increased, which leads to marked degradation in the transmission characteristic. In particular, when using, as the optical transmission path, an optical fiber in which a wavelength dispersion value in the signal wavelength band is in the vicinity of 0 to ±10 ps/nm/km, the coherent crosstalk attributable to four-wave mixed light generated by four-wave mixing, being one of the non-linear effects which occurs in the optical transmission path, becomes a cause of marked degradation in the transmission characteristic of the WDM signal light.

Conventionally, various techniques for suppressing this coherent crosstalk attributable to four-wave mixed light have been proposed, such as a method in which the wavelength allocation of signal lights is shifted slightly from the ITU grid, to realize unequally spaced allocation (the following literature 1), a method which uses the wavelength groups as described above (the following literatures 2 and 3), and a method in which the polarization of the signal lights of adjacent wavelengths are made orthogonal to each other and multiplexed (the following literature 4). The ITU grid is the wavelength allocation of signal lights, standardized by the international Telecommunication Union (ITU).

(Literature 1)

F. Forghieri, R. W. Tkach, A. R. Chraplyvy, and D. Marouse, "Reduction of four-wave mixing crosstalk in WDM systems using unequally spaced channels," IEEE Photon. Technol. Lett., vol. 6, pp. 754-756, June 1994.

(Literature 2)

I. Haxell, M, Ding, A. Akhtar, H. Wang, and P. Farrugia, "52×12.3 Gbit/s DWDM transmission over 3600 km of True Wave fiber with 100 km amplifier spans," PD5,OAA 2000.

(Literature 3)

Xiang-Dong Cao and Tau Yu, "Ultra long-haul DWDM transmission via nonlinearity management," OtuC5, pp.140-142,OAA 1999.

(Literature 4)

Neal S. Bergano et al., "320 Gb/s WDM Transmission (64×5 Gb/s) over 7,200 km using Large Mode Fiber Spans and Chirped Return-to-Zero Signals," OFC'98, postdeadline papers PD12, San Jose. USA, February 1998.

However, this conventional technology presents the following problems. Namely, with the method in which the unequally spaced allocation is used in the wavelength allocation of signal lights, since the wavelength allocation is shifted from the ITU grid, optical multiplexers/demultiplexers corresponding to ITU grid cannot be used, and the structures of optical multiplexers/demultiplexers are more complicated, which increase the cost of the system. Furthermore, with the method in which the wavelength groups are used, if (q, r) wavelength groups are used over the entire signal band, the frequency of signal light wavelength multiplexing is reduced by q/(q+r) times than that when signals are allocated in each individual wavelength, and this leads to the reduction in transmission capacity. In addition, with the method in which the polarization of the signal lights of adjacent wavelengths are made orthogonal to each other and multiplexed, it is necessary to keep a polarization state of the signal light constant until the signal light of each wavelength output from the optical transmitter is multiplexed in the optical multiplexer to be output as WDM signal light, which results in a costly system.

SUMMARY OF THE INVENTION

The present invention addresses the above problems, with an object of providing a wavelength allocation method for signal light capable of consecutively allocating signal lights efficiently on wavelength grids, while suppressing the degradation in transmission characteristic due to the generation of four-wave mixed light in an optical transmission path. It is a further object to provide an optical transmission apparatus and a wavelength division multiplexing optical transmission system which, by using the above wavelength allocation method, can realize high capacity wavelength division multiplexing transmission over long distance, at low cost.

In order to achieve the above objects, a wavelength allocation method of signal light according to the present invention, is one for use when allocating signal lights of two or more waves on wavelength grids where previously determined wavelength spacing is made a base unit, in wavelength division multiplexing optical transmission in which wavelength division multiplexed signal obtained by multiplexing a plurality of signal lights of different wavelengths is transmitted over an optical transmission path, wherein the method comprising; setting the consecutive allocation wavelength number of signal lights to be allocated consecutively on the wavelength grids, to different values according to wavelength bands, based on wavelength dependence of a generation amount of four-wave mixed light on the optical transmission path; and consecutively allocating the signal lights on the wavelength grids in accordance with the set consecutive allocation wavelength number, but not allocating the signal light on at least one wavelength grid adjacent to the wavelength grids on which a group or signal lights is consecutively allocated.

According to such a wavelength allocation method of signal light, the signal lights arm consecutively allocated on the wavelength grids in accordance with the consecutive allocation wavelength number, which is optimally set based on the wavelength dependence of the generation amount of four-wave mixed light in the optical transmission path. As a result, it becomes possible to perform wavelength allocation of signal lights effectively while suppressing degradation in transmission characteristic due to four-wave mixed light generated in the optical transmission path.

An optical transmission apparatus according to the present invention, for transmitting wavelength division multiplexed signal light obtained by multiplexing a plurality of signal lights of different wavelengths over an optical transmission path, comprises; a device which consecutively allocates signal lights on wavelength grids where previously determined wavelength spacing is made a base unit, in accordance with the consecutive allocation wavelength number set to different values according to wavelength bands, but not allocates the signal light on at least one wavelength grid adjacent to the wavelength grids on which a group of signal lights is consecutively allocated, and performs at least one of transmission and reception of wavelength division multiplexed signal light applied with the wavelength allocation of signal lights. Furthermore, a wavelength division multiplexing optical transmission system according to the present invention comprises the aforementioned optical transmission apparatus, and transmits the wavelength division multiplexed signal light via the optical transmission path.

With such an optical transmission apparatus and wavelength division multiplexing optical transmission system, the wavelength division multiplexed signal light applied with efficient wavelength allocation, which suppresses an influence due to four-wave mixed light as noted above, is transmitted. Therefore, the transmission distance can be extended while maintaining the large transmission capacity.

Other objects, characteristics and advantages of the present invention will become apparent from the following description of the embodiments in conjunction with to the appended drawings.

BRIEF DESCRIPTION OF THE DRAWINGS

FIG. 10 shows diagrams for explaining a relationship between a generation amount of four-wave mixed light and the wavelength allocation of signal lights.

DETAILED DESCRIPTION OF THE INVENTION

The following is a description of an embodiment of the present invention, based on the drawings.

Figure 1:
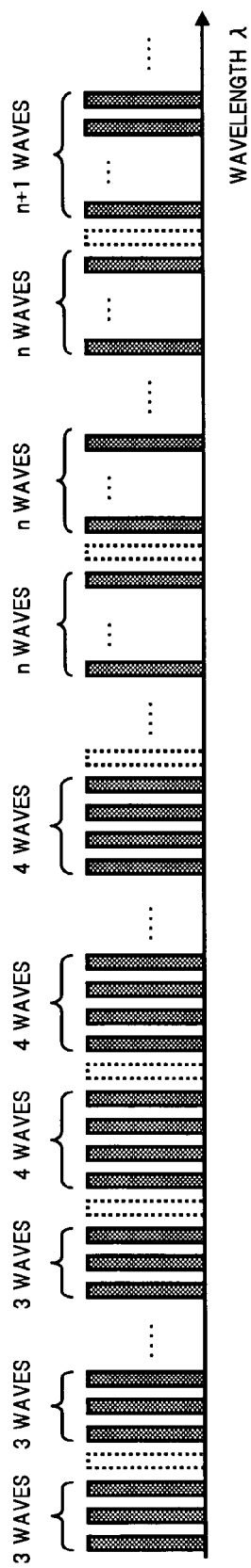
FIG. 1 is a schematic diagram showing an example of signal lights allocated on wavelength grids by applying a wavelength allocation method of signal light according to the present invention.

FIG. 1 is a schematic diagram showing an example of signal lights allocated on wavelength grids by applying a wavelength allocation method of signal light according to the present invention. Moreover, FIG. 2 is a flowchart showing specific procedures of the present wavelength allocation method.

Figure 2:
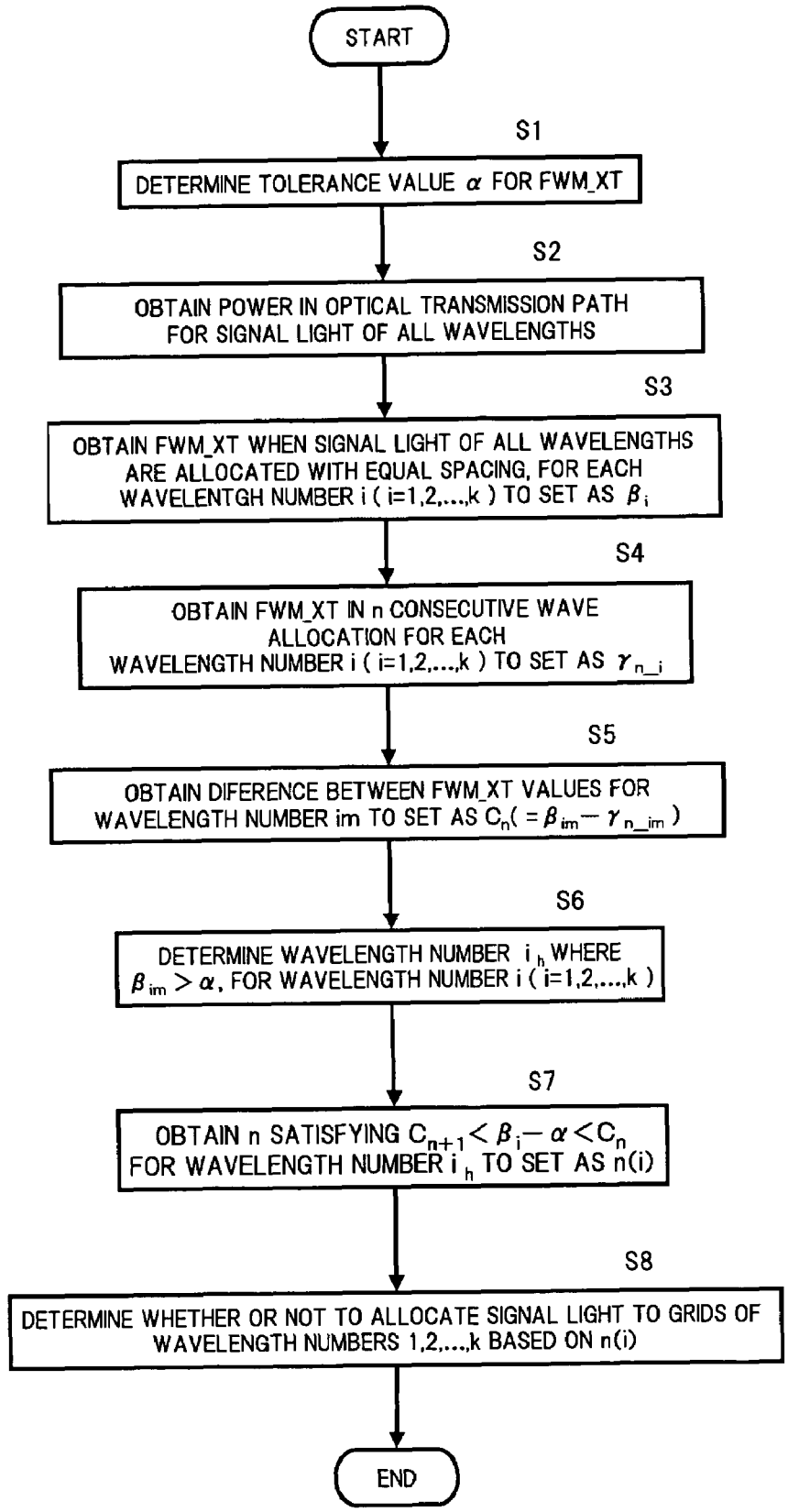
FIG. 2 is a flowchart showing specific procedures in the wavelength allocation method of signal light according to the present invention.

As shown in FIG. 2, in the present wavelength allocation method, first, in step 1 (referred to as S1, and similarly for other steps), a tolerance value α for a four-wave mixing crosstalk amount (FWM_XT) is determined. This tolerance value α can be optionally set depending on the specification of a WDM optical transmission system applied with the present wavelength allocation method (refer for example of the configuration shown in FIG. 12). Here, −27.7 dB is set as a specific example of the tolerance value α.

Next in step 2, the power in an optical transmission path is calculated for signal light of each wavelength transmitted in the WDM optical transmission system. Specifically, considering the transmission of signal lights of 160 waves, if all signal lights of 160 waves are allocated at equal spacing, the power in the optical transmission path for signal lights of all wavelengths is obtained, taking into consideration the optical power of signal lights input to the optical transmission path and stimulated Raman scattering occurring in the optical transmission path.

The following is a detailed description of calculation method of the power of the signal light in the optical transmission path, taking stimulated Raman scattering into consideration.

The pumping light intensity $I_p$ and Stokes light intensity $I_s$ in the stimulated Raman scattering is expressed by a combined equation of the following equations (1) and (2):

$$\frac{dI_s}{dz} = g_R I_p I_s - \alpha_s I_s \qquad (1)$$

$$\frac{dI_p}{dz} = -\frac{\omega_p}{\omega_s} g_R I_p I_s - \alpha_p I_p \qquad (2)$$

Here, $g_R$ is a Raman gain coefficient, and $\alpha_p$ and $\alpha_s$ are fiber losses to pumping light and Stokes light, respectively. Furthermore, $\omega_p$ and $\omega_s$ are the frequencies of the pumping light and the Stokes light, respectively, and z is a variable indicating a position on the optical transmission path.

In the combined equation above, a relationship between the pumping light intensity $I_p$ and the Stokes light intensity $I_s$, and pumping light power $P_p$ and the Stokes light power $P_s$ can be expressed by the following equations (3) and (4), respectively:

$$P_p(z) = A_{eff\_p} I_p(z) \qquad (3)$$

$$P_s(z) = A_{eff\_s} I_s(z) \qquad (4)$$

Here, $A_{eff\_p}$ and $A_{eff\_s}$ are effective cross-sections of the pumping light and the Stokes light, respectively.

In the WDM optical transmission system, the signal light of short wavelength corresponds to pumping light, and the signal light of long wavelength corresponds to Stokes light. In the equation (2) above, by taking only the second term on the right side of the equation into consideration, the following equation (5) is obtained.

$$I_p(z) = I_0 \exp(-\alpha_p z) \qquad (5)$$

where $I_0$ is the Intensity of the pumping light when z=0.

If the equation (5) is substituted into the equation (1) to obtain the Stokes light intensity $I_p$, a relationship in equation (8) is established.

$$I_s(z) = I_s(0) \exp\left[\frac{g_R I_0}{\alpha_p}\{1 - \exp(-\alpha_p z)\} - \alpha_s z\right] \qquad (6)$$

Accordingly, by substituting the equations (5) and (6) into the equations (3) and (4), the power in the optical transmission path of the short wavelength signal light which corresponds to the pumping light, and the long wavelength signal light which corresponds to Stokes light can be obtained.

A method for calculating the power in the optical transmission path of signal lights is well known from the literature, Govind P. Agrawal, "Nonlinear Fiber Optics," Chapter 8, Academic Press, Inc., 1989.

After obtaining the power in the optical transmission path of signal lights of all wavelengths in step 2, then in step 3, the amount of four-wave mixing crosstalk when the signal lights of 160 waves are all allocated at equal spacing is obtained for each wavelength number i (i=1, 2, . . . , 160), and the results thereof are made $\beta_i$. In other words, in step 3, the amounts of four-wave mixing crosstalk $\beta_1$ to $\beta_{160}$ when the signal lights of 160 waves are allocated on previously determined equally spaced wavelength grids are obtained.

Figure 3:
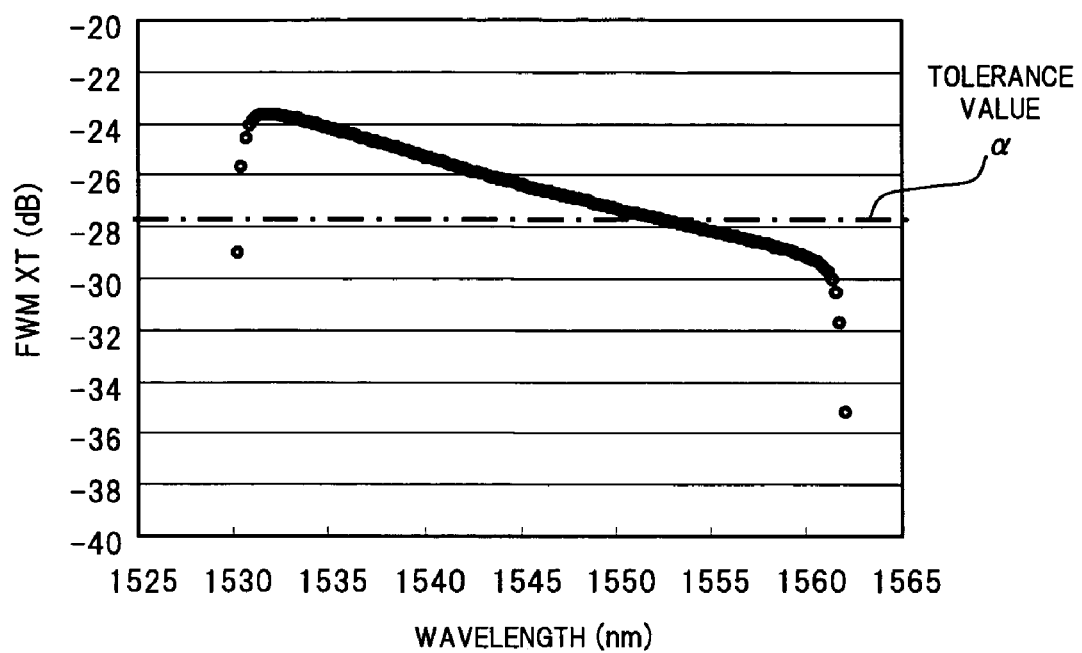
FIG. 3 is a diagram showing an example where a four-wave mixing crosstalk amount $\beta_1$ is plotted to a wavelength $\lambda$, when signal lights are allocated on all of the wavelengths on the wavelength grids.

FIG. 3 is a diagram showing an example where the four-wave mixing crosstalk amount $\beta_i$, determined for each wavelength number i, is plotted to wavelength λ. Furthermore, Table 1 below lists specific numerical values for the four-wave mixing crosstalk amount $\beta_i$ in FIG. 3, and other parameters to be described below. These numerical values are the calculation results of the four-wave mixing crosstalk amounts $\beta_i$, for when, in a WDM optical transmission system which uses a non-zero dispersion shifted fiber (NZ-DSF) of 100 km as the optical transmission path, and signal lights of 160 waves are allocated at equal wavelength spacing of 25 GHz, the input optical power to the optical transmission path is made 0 dBm/ch, and the signal light polarization states are all coincident with each other.

TABLE 1

| i | Wavelength (nm) | $\beta_i$ (dB) | $\beta_i - \alpha$ (dB) | (i) | Signal allocation |
|---|---|---|---|---|---|
| 1 | 1530.33 | −29.0 | −1.3 | 160 | ○ |
| 2 | 1530.53 | −25.7 | 2.0 | 4 | ○ |
| 3 | 1530.72 | −24.6 | 3.1 | 3 | ○ |
| 4 | 1530.92 | −24.1 | 3.6 | 3 | — |
| 5 | 1531.12 | −23.9 | 3.8 | 3 | ○ |
| 6 | 1531.31 | −23.8 | 3.9 | 3 | ○ |
| 7 | 1531.51 | −23.7 | 4.0 | 3 | ○ |
| 8 | 1531.70 | −23.7 | 4.0 | 3 | — |
| 9 | 1531.90 | −23.7 | 4.0 | 3 | ○ |
| 10 | 1532.09 | −23.7 | 4.0 | 3 | ○ |
| 11 | 1532.29 | −23.7 | 4.0 | 3 | ○ |
| 12 | 1532.49 | −23.7 | 4.0 | 3 | — |
| 13 | 1532.68 | −23.7 | 4.0 | 3 | ○ |
| 14 | 1532.88 | −23.8 | 3.9 | 3 | ○ |
| 15 | 1533.07 | −23.8 | 3.9 | 3 | ○ |
| 16 | 1533.27 | −23.8 | 3.9 | 3 | — |
| 17 | 1533.47 | −23.9 | 3.8 | 3 | ○ |
| 18 | 1533.66 | −23.9 | 3.8 | 3 | ○ |
| 19 | 1533.86 | −23.9 | 3.8 | 3 | ○ |
| 20 | 1534.05 | −24.0 | 3.7 | 3 | — |
| 21 | 1534.25 | −24.0 | 3.7 | 3 | ○ |
| 22 | 1534.45 | −24.1 | 3.6 | 3 | ○ |
| 23 | 1534.64 | −24.1 | 3.6 | 3 | ○ |
| 24 | 1534.84 | −24.1 | 3.6 | 3 | — |
| 25 | 1535.04 | −24.2 | 3.5 | 3 | ○ |
| 26 | 1535.23 | −24.2 | 3.5 | 3 | ○ |
| 27 | 1535.43 | −24.3 | 3.4 | 3 | ○ |
| 28 | 1535.63 | −24.3 | 3.4 | 3 | — |
| 29 | 1535.82 | −24.3 | 3.4 | 3 | ○ |
| 30 | 1536.02 | −24.4 | 3.3 | 3 | ○ |
| 31 | 1536.22 | −24.4 | 3.3 | 3 | ○ |
| 32 | 1536.41 | −24.5 | 3.2 | 3 | — |
| 33 | 1536.61 | −24.5 | 3.2 | 3 | ○ |
| 34 | 1536.81 | −24.6 | 3.1 | 3 | ○ |
| 35 | 1537.00 | −24.6 | 3.1 | 3 | ○ |
| 36 | 1537.20 | −24.6 | 3.1 | 3 | — |
| 37 | 1537.40 | −24.7 | 3.0 | 3 | ○ |
| 38 | 1537.59 | −24.7 | 3.0 | 3 | ○ |
| 39 | 1537.79 | −24.8 | 2.9 | 3 | ○ |
| 40 | 1537.99 | −24.8 | 2.9 | 3 | — |
| 41 | 1538.19 | −24.9 | 2.8 | 4 | ○ |
| 42 | 1538.38 | −24.9 | 2.8 | 4 | ○ |
| 43 | 1538.58 | −25.0 | 2.7 | 4 | ○ |
| 44 | 1538.78 | −25.0 | 2.7 | 4 | ○ |
| 45 | 1538.98 | −25.1 | 2.6 | 4 | — |
| 46 | 1539.17 | −25.1 | 2.6 | 4 | ○ |
| 47 | 1539.37 | −25.1 | 2.6 | 4 | ○ |
| 48 | 1539.57 | −25.2 | 2.5 | 4 | ○ |
| 49 | 1539.77 | −25.2 | 2.5 | 4 | ○ |
| 50 | 1539.96 | −25.3 | 2.4 | 4 | — |
| 51 | 1540.16 | −25.3 | 2.4 | 4 | ○ |
| 52 | 1540.36 | −25.4 | 2.3 | 4 | ○ |
| 53 | 1540.56 | −25.4 | 2.3 | 4 | ○ |
| 54 | 1540.76 | −25.5 | 2.2 | 4 | ○ |
| 55 | 1540.95 | −25.5 | 2.2 | 4 | — |
| 56 | 1541.15 | −25.6 | 2.1 | 4 | ○ |
| 57 | 1541.35 | −25.6 | 2.1 | 4 | ○ |
| 58 | 1541.55 | −25.6 | 2.1 | 4 | ○ |
| 59 | 1541.75 | −25.7 | 2.0 | 4 | ○ |
| 60 | 1541.94 | −25.7 | 2.0 | 4 | — |
| 61 | 1542.14 | −25.8 | 1.9 | 4 | ○ |
| 62 | 1542.34 | −25.8 | 1.9 | 4 | ○ |
| 63 | 1542.54 | −25.9 | 1.8 | 4 | ○ |
| 64 | 1542.74 | −25.9 | 1.8 | 4 | ○ |
| 65 | 1542.94 | −26.0 | 1.7 | 4 | — |
| 66 | 1543.13 | −26.0 | 1.7 | 5 | ○ |
| 67 | 1543.33 | −26.0 | 1.7 | 5 | ○ |
| 68 | 1543.53 | −26.1 | 1.6 | 5 | ○ |
| 69 | 1543.73 | −26.1 | 1.6 | 5 | ○ |
| 70 | 1543.93 | −26.2 | 1.5 | 5 | ○ |
| 71 | 1544.13 | −26.2 | 1.5 | 5 | — |
| 72 | 1544.33 | −26.2 | 1.5 | 5 | ○ |
| 73 | 1544.53 | −26.3 | 1.4 | 5 | ○ |
| 74 | 1544.72 | −26.3 | 1.4 | 5 | ○ |
| 75 | 1544.92 | −26.4 | 1.3 | 5 | ○ |
| 76 | 1545.12 | −26.4 | 1.3 | 6 | ○ |
| 77 | 1545.32 | −26.5 | 1.2 | 6 | — |
| 78 | 1545.52 | −26.5 | 1.2 | 6 | ○ |
| 79 | 1545.72 | −26.5 | 1.2 | 6 | ○ |
| 80 | 1545.92 | −26.6 | 1.1 | 6 | ○ |
| 81 | 1546.12 | −26.6 | 1.1 | 6 | ○ |
| 82 | 1546.32 | −26.7 | 1.0 | 6 | ○ |
| 83 | 1546.52 | −26.7 | 1.0 | 6 | ○ |
| 84 | 1546.72 | −26.7 | 1.0 | 6 | — |
| 85 | 1546.92 | −26.8 | 0.9 | 6 | ○ |
| 86 | 1547.12 | −26.8 | 0.9 | 7 | ○ |
| 87 | 1547.32 | −26.8 | 0.9 | 7 | ○ |
| 88 | 1547.52 | −26.9 | 0.8 | 7 | ○ |
| 89 | 1547.72 | −26.9 | 0.8 | 8 | ○ |
| 90 | 1547.92 | −26.9 | 0.8 | 8 | ○ |
| 91 | 1548.11 | −27.0 | 0.7 | 8 | — |
| 92 | 1548.31 | −27.0 | 0.7 | 8 | ○ |
| 93 | 1548.51 | −24.0 | 0.7 | 8 | ○ |
| 94 | 1548.71 | −27.1 | 0.6 | 10 | ○ |
| 95 | 1548.91 | −27.1 | 0.6 | 10 | ○ |
| 96 | 1549.11 | −27.2 | 0.5 | 11 | ○ |
| 97 | 1549.31 | −27.2 | 0.5 | 11 | ○ |
| 98 | 1549.52 | −27.2 | 0.5 | 11 | ○ |
| 99 | 1549.72 | −27.3 | 0.4 | 14 | ○ |
| 100 | 1549.92 | −27.3 | 0.4 | 14 | — |
| 101 | 1550.12 | −27.4 | 0.3 | 15 | ○ |
| 102 | 1550.32 | −27.4 | 0.3 | 15 | ○ |
| 103 | 1550.52 | −27.4 | 0.3 | 15 | ○ |
| 104 | 1550.72 | −27.5 | 0.2 | 15 | ○ |
| 105 | 1550.92 | −27.5 | 0.2 | 15 | ○ |
| 106 | 1551.12 | −27.5 | 0.2 | 15 | ○ |
| 107 | 1551.32 | −27.6 | 0.1 | 15 | ○ |
| 108 | 1551.52 | −27.6 | 0.1 | 15 | ○ |
| 109 | 1551.72 | −27.6 | 0.1 | 15 | ○ |
| 110 | 1551.92 | −27.7 | 0.0 | 160 | ○ |
| 111 | 1552.12 | −27.7 | 0.0 | 160 | ○ |
| 112 | 1552.32 | −27.7 | 0.0 | 160 | ○ |
| 113 | 1552.52 | −27.8 | −0.1 | 160 | ○ |
| 114 | 1552.73 | −27.8 | −0.1 | 160 | ○ |
| 115 | 1552.93 | −27.8 | −0.1 | 160 | ○ |
| 116 | 1553.13 | −27.9 | −0.2 | 160 | — |
| 117 | 1553.33 | −27.9 | −0.2 | 160 | ○ |
| 118 | 1553.53 | −27.9 | −0.2 | 160 | ○ |
| 119 | 1553.73 | −28.0 | −0.3 | 160 | ○ |
| 120 | 1553.93 | −28.0 | −0.3 | 160 | ○ |
| 121 | 1554.13 | −28.0 | −0.3 | 160 | ○ |
| 122 | 1554.34 | −28.1 | −0.4 | 160 | ○ |
| 123 | 1554.54 | −28.1 | −0.4 | 160 | ○ |
| 124 | 1554.74 | −28.1 | −0.4 | 160 | ○ |
| 125 | 1554.94 | −28.2 | −0.5 | 160 | ○ |
| 126 | 1555.14 | −28.2 | −0.5 | 160 | ○ |
| 127 | 1555.34 | −28.2 | −0.5 | 160 | ○ |
| 128 | 1555.55 | −28.3 | −0.6 | 160 | ○ |
| 129 | 1555.75 | −28.3 | −0.6 | 160 | ○ |
| 130 | 1555.95 | −28.3 | −0.6 | 160 | ○ |
| 131 | 1556.15 | −28.4 | −0.7 | 160 | ○ |
| 132 | 1556.35 | −28.4 | −0.7 | 160 | ○ |
| 133 | 1556.55 | −28.5 | −0.8 | 160 | ○ |
| 134 | 1556.76 | −28.5 | −0.8 | 160 | ○ |
| 135 | 1556.96 | −28.5 | −0.8 | 160 | ○ |
| 136 | 1557.16 | −28.6 | −0.9 | 160 | ○ |
| 137 | 1557.36 | −28.6 | −0.9 | 160 | ○ |
| 138 | 1557.57 | −28.6 | −0.9 | 160 | ○ |
| 139 | 1557.77 | −28.7 | −1.0 | 160 | ○ |
| 140 | 1557.97 | −28.7 | −1.0 | 160 | ○ |
| 141 | 1558.17 | −28.8 | −1.1 | 160 | ○ |
| 142 | 1558.38 | −28.8 | −1.1 | 160 | ○ |

TABLE 1-continued

| i | Wavelength (nm) | $\beta_i$ (dB) | $\beta_i - \alpha$ (dB) | (i) | Signal allocation |
|---|---|---|---|---|---|
| 143 | 1558.58 | −28.8 | −1.1 | 160 | ○ |
| 144 | 1558.78 | −28.9 | −1.2 | 160 | ○ |
| 145 | 1558.98 | −28.9 | −1.2 | 160 | ○ |
| 146 | 1559.19 | −29.0 | −1.3 | 160 | ○ |
| 147 | 1559.39 | −29.0 | −1.3 | 160 | ○ |
| 148 | 1559.59 | −29.1 | −1.4 | 160 | ○ |
| 149 | 1559.79 | −29.1 | −1.4 | 160 | ○ |
| 150 | 1560.00 | −29.2 | −1.5 | 160 | ○ |
| 151 | 1560.20 | −29.2 | −1.5 | 160 | ○ |
| 152 | 1560.40 | −29.3 | −1.6 | 160 | ○ |
| 153 | 1560.61 | −29.4 | −1.7 | 160 | ○ |
| 154 | 1560.81 | −29.5 | −1.8 | 160 | ○ |
| 155 | 1561.01 | −29.6 | −1.9 | 160 | ○ |
| 156 | 1561.22 | −29.8 | −2.1 | 160 | ○ |
| 157 | 1561.42 | −30.1 | −2.4 | 160 | ○ |
| 158 | 1561.62 | −30.6 | −2.9 | 160 | ○ |
| 159 | 1561.83 | −31.8 | −4.1 | 160 | ○ |
| 160 | 1562.03 | −35.2 | −7.5 | 160 | ○ |

In the numerical values of the calculation results shown in FIG. 3 and Table 1, the four-wave mixing crosstalk amount (I for when the signal lights of 160 waves are all allocated at equal spacing is in a range of between −36 dB and −23 dB, and as a whole, the four-wave mixing crosstalk amount (i is larger on the short wavelength side, with a difference of approximately 6 dB from the long wavelength sides. The reason why the four-wave mixing crosstalk amount is minimal at the wavelengths on both ends is that wavelength combinations generating four-wave mixed light is less. For the tolerance value ((the single dot chain line in FIG. 3) determined in step 1 to be −27.7 dB, the four-wave mixing crosstalk amount exceeding the tolerance value (is generated between the wavelength number 2 and the wavelength number 109 (the range of wavelengths from 1530.53 nm to 1551.72 nm).

Next, in step 4, the four-wave mixing crosstalk amount for the case where the signal lights of n waves (n=2, 3, . . . ) allocated consecutively on the equally spaced wavelength grids, and the signal light is not allocated on one wavelength grid adjacent to the grids on which a group of signal lights is allocated consecutively, that is, for the case where the wavelength allocation corresponding to (n, 1) wavelength groups is performed, is calculated for each wavelength number i (i= 2, . . . 160), and the results thereof are made $Y_{n\_1}$. In other words, in step 4, the four-wave mixing crosstalk amounts $Y_{n\_1}$ to $Y_{n\_160}$ for when the wavelength allocation is performed corresponding to (n, 1) wavelength groups, are calculated.

Figure 4:
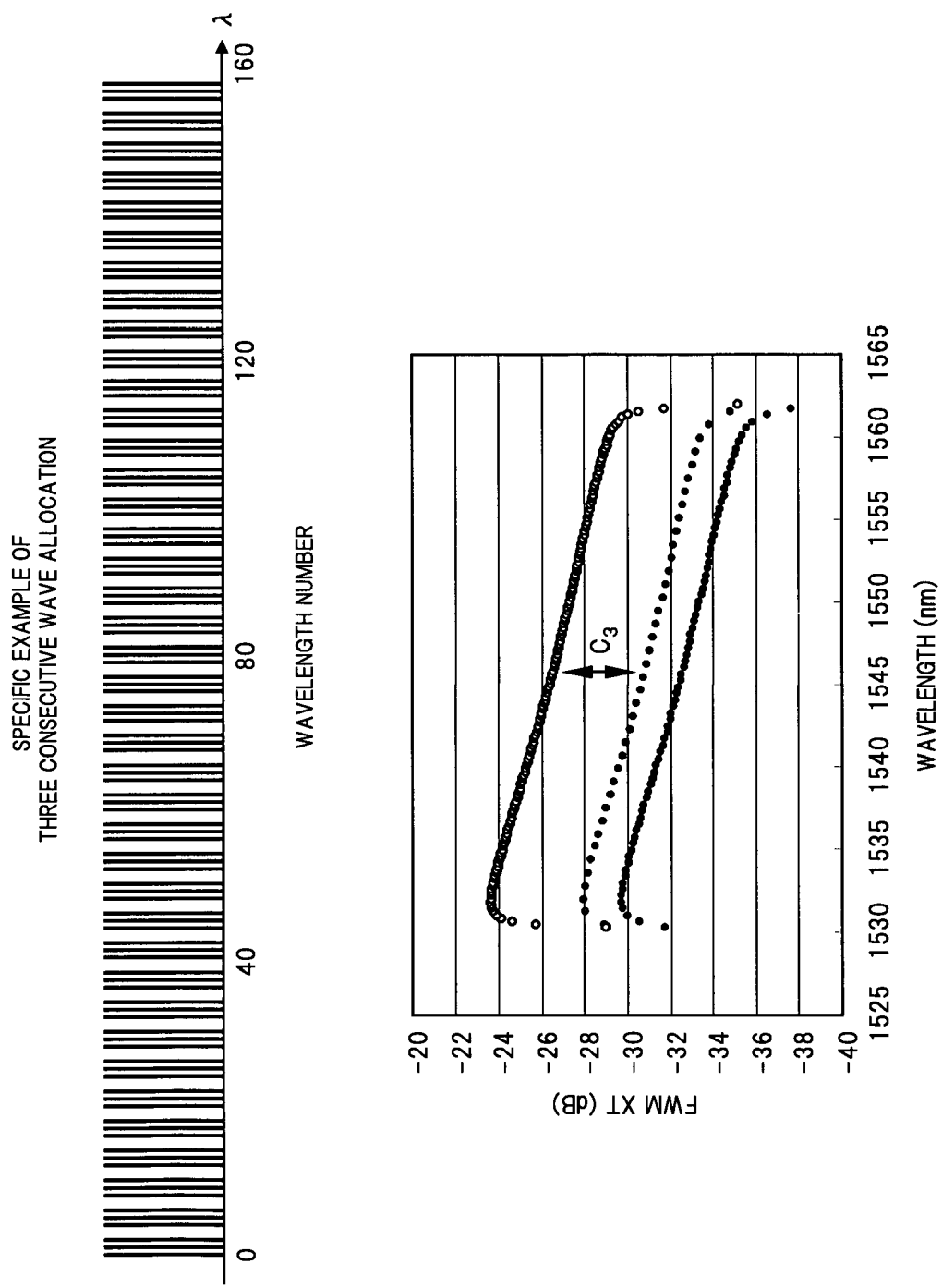
FIG. 4 shows an example of wavelength allocation and four-wave mixing crosstalk amount $Y_{3\_i}$ when signal lights of three waves are consecutively allocated on the wavelength grids.
Figure 5:
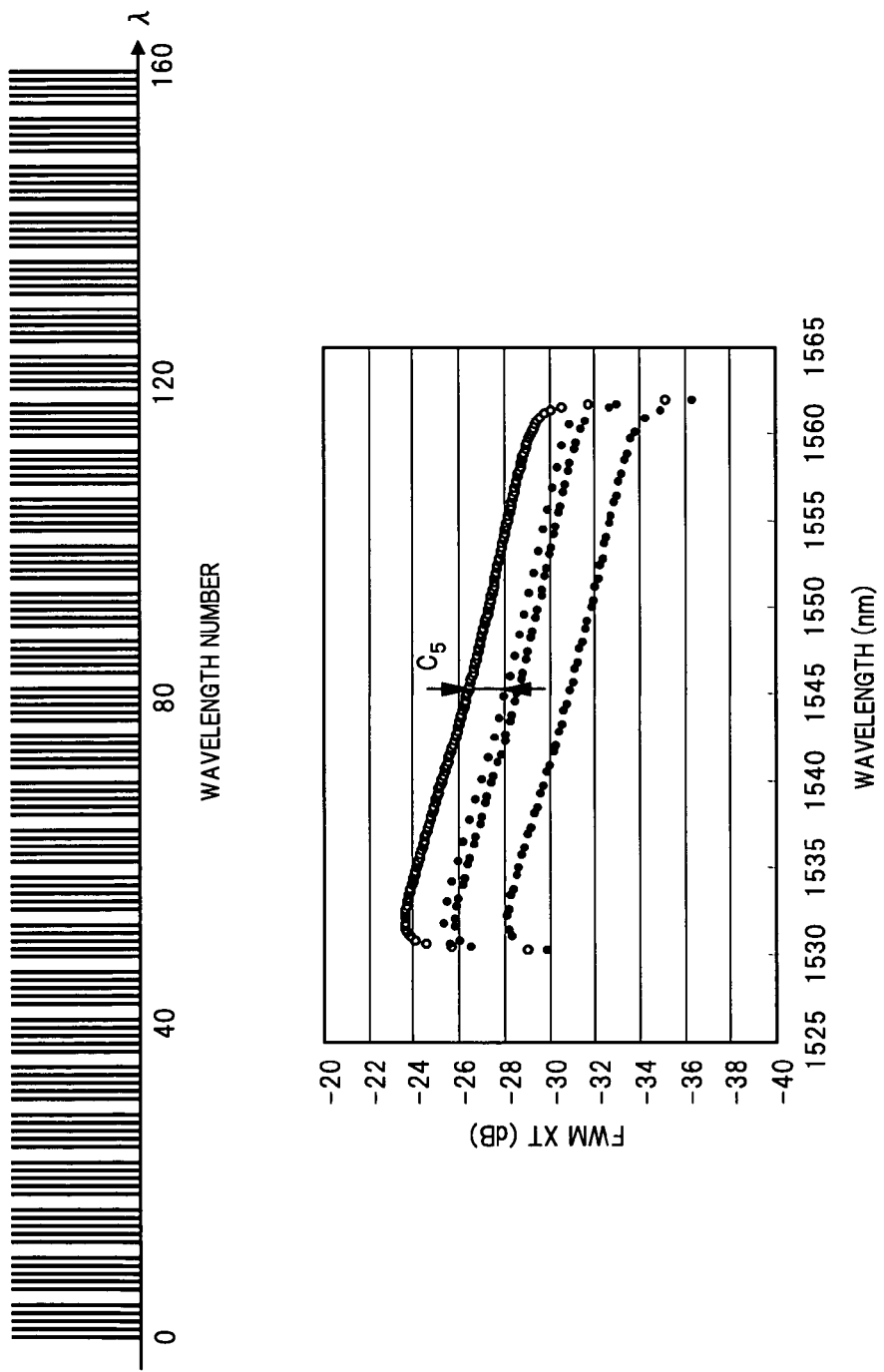
FIG. 5 shows an example of wavelength allocation and four-wave mixing crosstalk amount $Y_{5\_i}$ when signal lights of five waves are consecutively allocated on the wavelength grid.

The explanation is given by a specific example. Assuming that n=3 and performing the wavelength allocation corresponding to (3, 1) wavelength groups, the wavelength allocation of the signal lights shown in the upper part of FIG. 4 is obtained, and the four-wave mixing crosstalk amounts $Y_{3\_1}$ to $Y_{3\_160}$ as indicated by the black dots in the lower part of FIG. 4 are calculated. Furthermore, assuming that n=5 and performing the wavelength allocation corresponding to (5, 1) wavelength groups, the wavelength allocation of the signal lights shown in the upper part of FIG. 5 is obtained, and the four-wave mixing crosstalk amount (5_1 to (5_160 as indicated by the black dots in the lower part of FIG. 5 are calculated. The white dots in both FIG. 4 and FIG. 5 are the four-wave mixing cross-talk amounts (I obtained in step 3. Furthermore, also in the numerical calculations in FIG. 4 and FIG. 5, the same conditions as for FIG. 3 are applied.

Next, in step 5, from those wavelength groups in which the signal lights of n waves are allocated consecutively in step 4, the wavelength group including the center wavelength of, for example, the wavelength grids of 160 waves, is selected, specifically, the wavelength group including the wavelength number i=80 for when the wavelength number is i=1, 2, . . . in order from the short wavelength side. Here, the wavelength group is selected based on the center wavelength of the wavelength grids, but the wavelength group positioned at another location on the wavelength grids may be selected instead. Furthermore, if there is no signal light on the wavelength grid of i=80, then the wavelength group including the signal light closest to the wavelength grid of i=80 is selected. Then, for the wavelength number im, having the largest amount of four-wave mixing crosstalk, among the signal light in that wavelength group, Cn defined by equation (7), in other words, a difference of the four-wave mixing crosstalk amount (im obtained in step 4 from the four-wave mixing crosstalk amount (im obtained in step 3, is obtained.

EMBED Equation .3 $C_n = \beta_{im} - \gamma_{n\_im}$ (7)

Specifically, $C_3$ determined when n=3 in FIG. 4, and $C_5$ determined when n=5 in FIG. 5, are shown in the respective figures. The numerical values shown in Table 2 are a collection of specific examples of values of $C_n$ with the value of n is increased to 2, 3, and so on.

TABLE 2

| n | $C_n$ (dB) |
|---|---|
| 2 | 9.5 |
| 3 | 4.3 |
| 4 | 2.8 |
| 5 | 1.7 |
| 6 | 1.3 |
| 7 | 0.9 |
| 8 | 0.8 |
| 9 | 0.6 |
| 10 | 0.6 |
| 11 | 0.5 |
| 12 | 0.4 |
| 13 | 0.4 |
| 14 | 0.4 |
| 15 | 0.3 |

Next, in step 6, the wavelength number i where $\beta i > \alpha$ is determined, for the wavelength numbers i (i=1 to 160). Then, in step 7, for the wavelength number i where $\beta i > \alpha$, a value of n which satisfies a relationship in the equation (6) is obtained, and the result thereof is made n(i). For the wavelength number i where $\beta i \leq \alpha$, a value of n(i)=160 (the total number of wavelengths) is set.

$$C_{n+1} < \beta_i - \alpha \leq C_n \quad (8)$$

Figure 6:
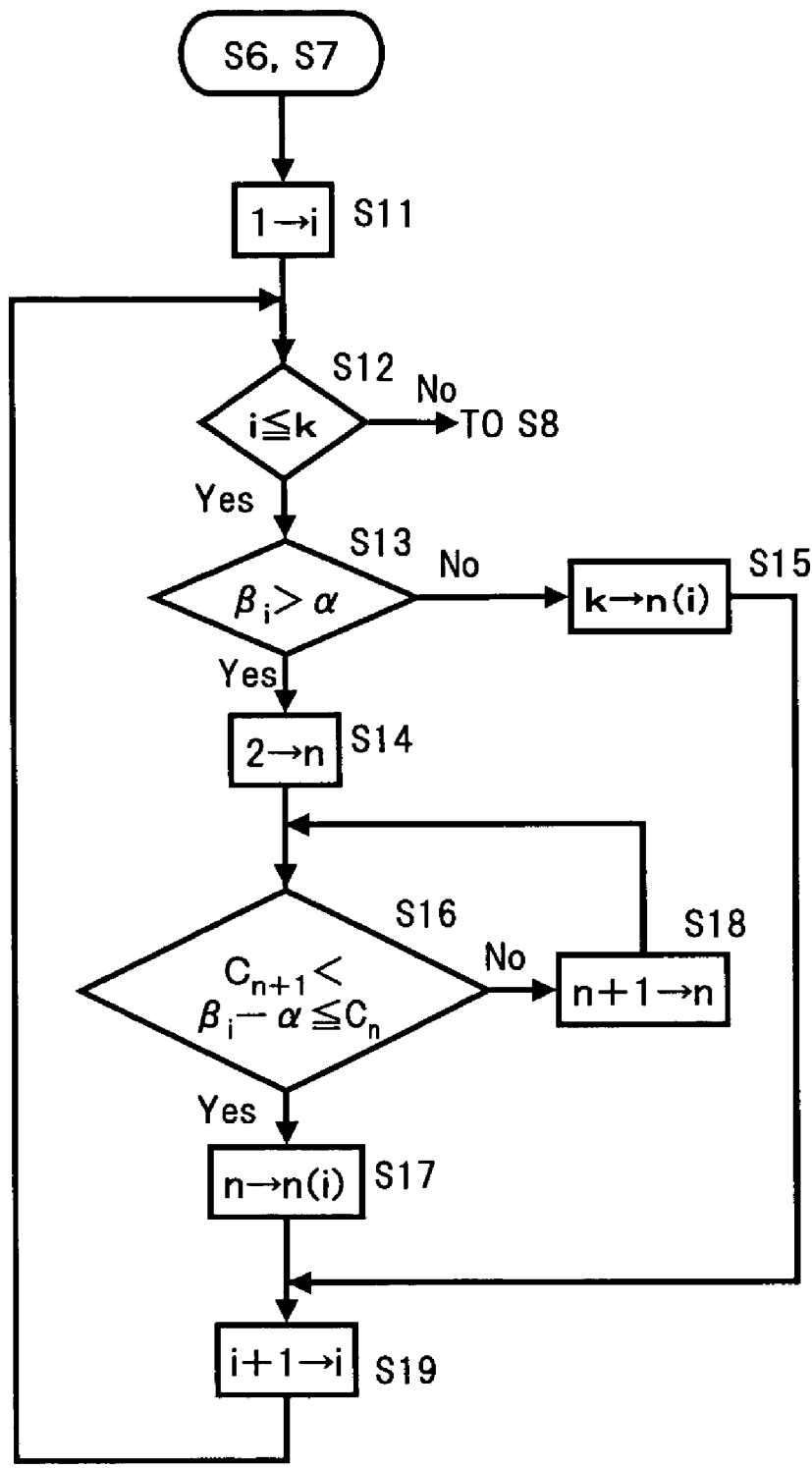
FIG. 6 is a flowchart showing a generalized specific example of the processing in steps 6 and 7 in FIG. 2.

The processing in steps 6 and 7, when generalized, becomes the procedure shown in a flowchart in FIG. 6. Specifically, in step 11 in FIG. 6, an initial value of the wavelength number i is set to 1. In step 12, it is judged that the wavelength number i is equal to or less than a maximum wavelength number k, and the processing proceeds to step 13. If i>k, then the processing in steps 6 and 7 is terminated, and the processing proceeds to step 8. In step 13, it is judged whether or not the relationship $\beta_i > \alpha$ is satisfied. If judged that $\beta_i > \alpha$, the processing proceeds to step 14. On the other hand, if judged that $\beta_i < \alpha$, then in step 15, the maximum wavelength number k is set to n(i) and the processing proceeds to step 19.

In step 15, 2 is set to an initial value of n. In step 16, it is judged whether or not the relationship in equation (8) is satisfied. If judged that the relationship in equation (8) is satisfied, then in step 17, the value of n at the time of judgment is set to n(i), and the processing proceeds to step 19. On the other hand, if judged that the relationship in equation (8) is not satisfied, then in step 18, the value of n is incremented by one, and the processing returns to step 16. In step 19, the value of the wavelength number i is incremented by one, the processing returns to step 12, and the above processing is repeated.

Examples of n(i) obtained for each wavelength number i in accordance with the procedures of step 11 through step 19 are shown in Table 1 above. In the specific examples of Table 1, wavelength numbers from 2 to 109 correspond to the wavelength number i where $\beta_i > \alpha$, and n(i) value which satisfy equation (8) is in a range from 3 to 15. Moreover, wavelength numbers 1 and 110 to 160 correspond to the wavelength number i where $\beta_i \leq ($, and the wavelength number n(i) is 160.

Once the value of n(i) is obtained for each wavelength number i in step 7, the processing proceeds to step 8, and it is determined whether or not to allocate the signal lights on the wavelength grids corresponding to the wavelength numbers 1 through 160. Specifically, it is possible to determine the wavelength allocation of signal light in order from the smallest or from the largest for the wavelength number i. Here, a detailed description is given of the procedure for determining the wavelength allocation in order from the smallest for the wavelength number i.

First, as shown in Table 1, when the wavelength number is 1, the value of n(1) is 160, Then, when the wavelength number is 2, the value of n(2) is 4. Therefore, for the wavelength numbers 1 and 2, by allocating the signal lights of four waves are allocated consecutively and not allocating the signal light on one wavelength grid adjacent to the wavelength grids on which the group or signal lights is allocated consecutively, that is, by performing the wavelength allocation corresponding to (4, 1) wavelength groups, the four-wave mixing crosstalk amount can be kept the tolerance value (or below. However, in the case where the signal lights are allocated consecutively on the wavelength grids corresponding to the wavelength numbers 1, 2, 3 and 4, since for the wavelength numbers 3 and 4, n(3) and n(4) are both 3, the four-wave mixing crosstalk amount exceeds the tolerance value (.

Therefore, consideration is given to the wavelength allocation according to (3, 1) wavelength groups, in which the signal lights of three waves are allocated consecutively, and the signal light is not allocated on one wavelength grid adjacent to the wavelengths grids on which the group of signal lights is allocated consecutively. When the signal lights are allocated on the wavelength numbers 1, 2 and 3, the values of n(1) through n(3) are all 3 or above for any of these wavelength numbers. Therefore, the four-wave mixing crosstalk amount can be kept the tolerance value $\alpha$ or below. In other words, when N waves are allocated consecutively, a value of N should be as large as possible, so that the value of n(i) corresponding to each wavelength number is equal to or greater than N.

As described above, by selecting N–3 for the wavelength group including the signal light of the wavelength number 1, the wavelength allocation is determined wherein the signal lights are allocated on the grids corresponding to the wavelength numbers 1, 2 and 3, and the signal light is not allocated on the next wavelength grid on the longer wavelength side from the longest wavelength grid of the wavelength grids on which the signal lights are allocated consecutively, that is, the signal light is not allocated on the wavelength grid corresponding to the wavelength number 4.

Next, the wavelength allocation of the signal light is determined for the wavelength number 5 which is positioned on the next wavelength grid on the longer wavelength side from the wavelength grid corresponding to the wavelength number 4 on which no signal light is allocated, in accordance with the same procedure as for the wavelength number 1. In the examples in Table 1, since n(5)=3, n(6)=3 and n(7)=3, the wavelength allocation is determined wherein the signal lights are allocated on the grids corresponding to the wavelength numbers 5, 6 and 7, but the signal light is not allocated on the grid corresponding to the wavelength number 8.

These procedures are repeated for the subsequent wavelength numbers 9 through 160, determining in sequence whether or not to allocate the signal lights on the grids corresponding to the respective wavelength numbers.

Figure 7:
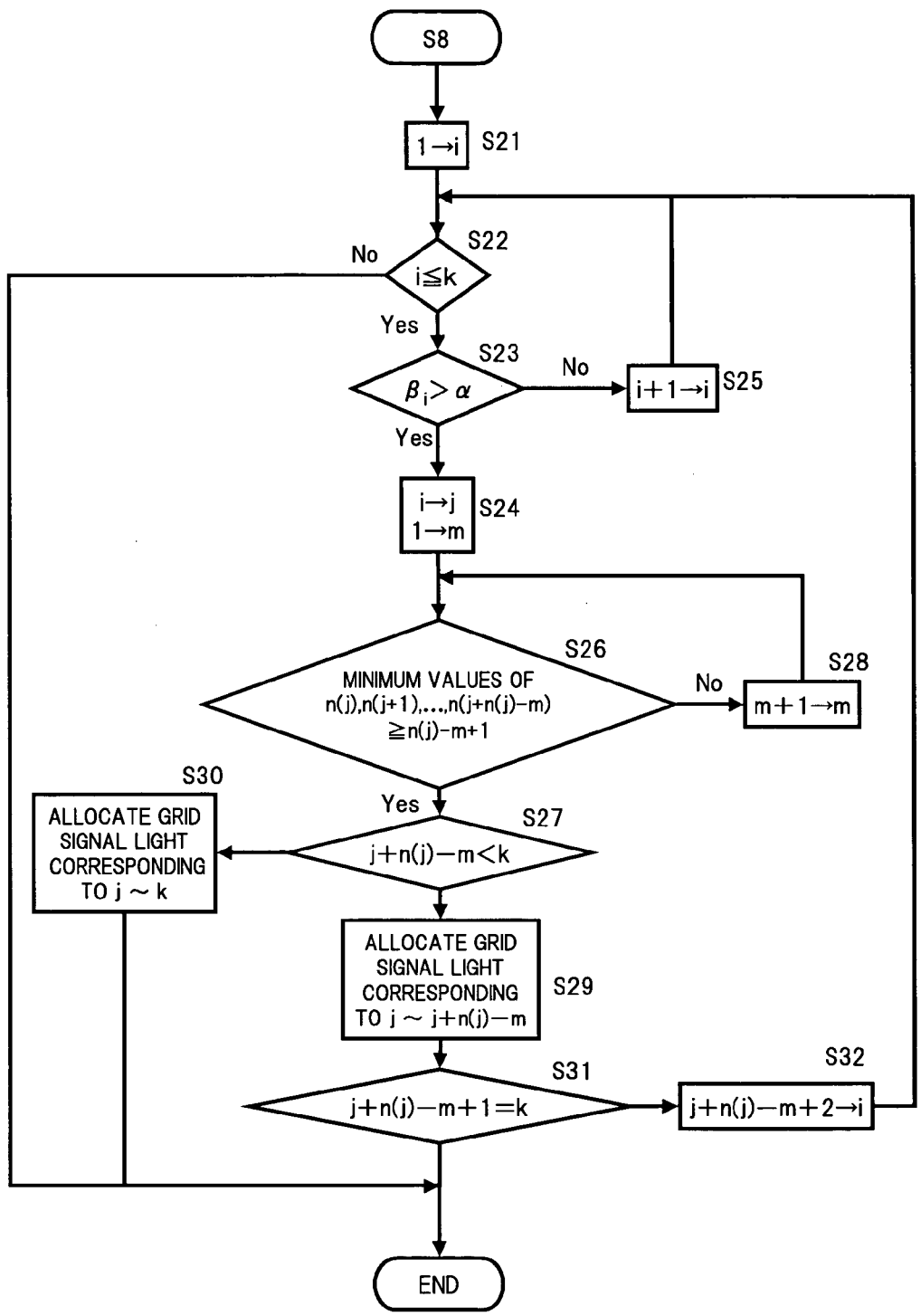
FIG. 7 is a flowchart showing a generalized specific example of the processing in step 8 in FIG. 2.

Generalizing the series of processes in step 8 results in the procedures shown in a flowchart in FIG. 7. Specifically, in step 21 in FIG. 7, 1 is set as the initial value of the wavelength number 1. In step 22, it is judged that the wavelength number i is equal to or less than the maximum wavelength number k (here 160), and the processing proceeds to step 23. If i>k, then the series of processing in step 8 is terminated. In step 23, it is judged whether or not the relationship $\beta_i > \alpha$ is satisfied. If judged the $\beta_i > \alpha$, the processing proceeds to step 24. On the other hand, if judged that $\beta_i < \alpha$, then in step 25, the value of the wavelength number i is incremented by one, and the processing returns to step 22.

In step 24, the wavelength number i which satisfies the relationship $\beta_i > \alpha$ is set as a minimum wavelength number j for use in the subsequent processing. Furthermore, a variable m representing a value in a range from 1 to n(j) is set to 1. In step 28, it is judged whether the minimum values of n(j), n(j+1), ... n(j+n(j)=m) are equal to or greater than n(j)–m+1. If judged to be equal to or greater than n(j)–m+1, the processing proceeds to step 27, while if judged to be less than n(j)–m+1, then in step 28, the value of the variable m is incremented by one and the processing returns to step 28.

In step 27, it is judged whether the value of j+n(j)–m is less than the maximum wavelength number k. If judged to be less than the maximum wavelength number k, then in step 29, the signal lights are allowed on the wavelength grids corresponding to the wavelength numbers from j to j+n(j)–m, but the signal light is not allocated on the wavelength grid corresponding to the wavelength number j+n(j)–m+1, and the processing proceeds to step 31. On the other hand, if judged to be greater than the maximum wavelength number k, then in step 30, the the signal lights are allocated on the wavelength grids corresponding to the wavelength numbers j through k, and the series of processing in step 8 is terminated.

In step 31, if j+n(j)–m+1 equals the maximum wavelength number k, then the series of processing in step 8 is terminated, but if the value of j+n(j)–m+1 has not yet reached the maximum wavelength number k, then in step 32, after j+n(j)–m+2 is set to the wavelength number i, the processing returns to step 22.

When the processing from step 21 to step 32 is finished, as shown in the schematic diagram of FIG. 1 and in the specific example in FIG. 8, finally, the wavelength allocation is determined wherein the signal lights of 139 waves can be allocated on the wavelength grids capable of allocating thereon the signal lights of 160 waves at equal spacing, while suppressing the four-wave mixing crosstalk amount below the tolerance value (.

Next, the detailed description is given to the theory in that the four-wave mixed light is reduced by such wavelength allocation of the signal light.

Figure 9:
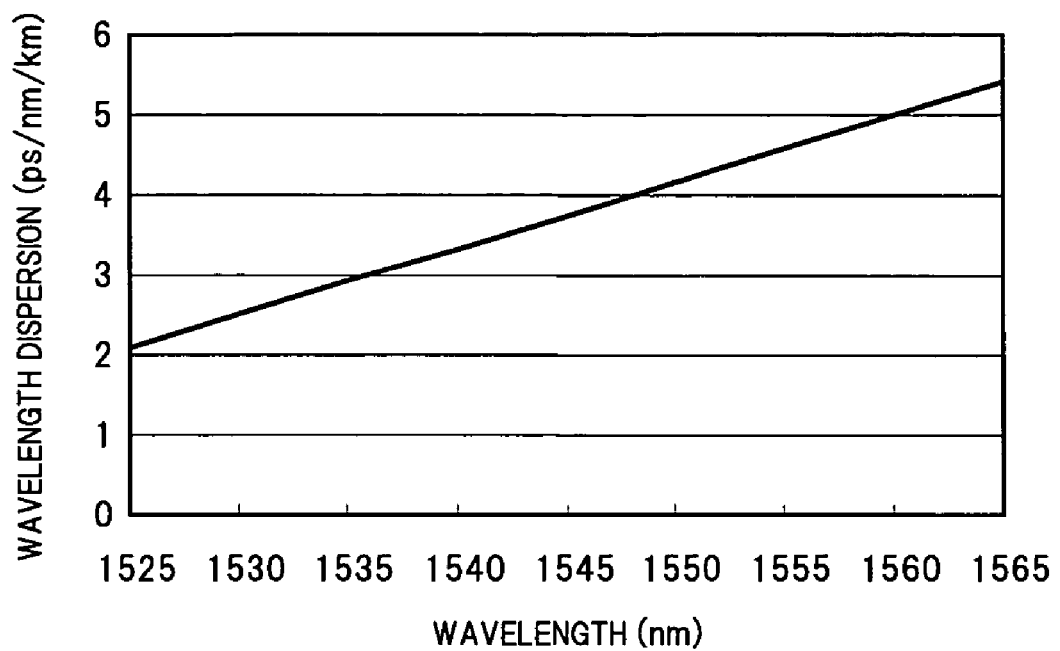
FIG. 9 shows an example of wavelength dispersion characteristic of typical NZ-DSF.

FIG. 9 is an example of wavelength dispersion characteristics of a NZ-DSF used as the optical transmission path. As shown in FIG. 9, normally, a wavelength dispersion value of an optical fiber has wavelength dependence. Therefore, since the wavelength dependence is also present in a generation amount of four-wave mixed light, it becomes effective to determine the wavelength allocation of the signal light considering this wavelength dependence. In other words, since the generation amount of four-wave mixed light is increased in the wavelength having a smaller absolute wavelength dispersion value, it is necessary to minimize the number of wavelengths to be allocated consecutively on the wavelength grids. Conversely, since the generation amount of four-wave mixed light is decreased in the wavelength having a larger absolute wavelength dispersion value, a large number of wavelengths can be allocated consecutively. In this manner, by efficiently allocating the signal lights on the wavelength grids based on the wavelength dependence of the generation amount of four-wave mixed light, it becomes possible to achieve the suppression of the four-wave mixing crosstalk amount and the increase in transmission capacity, compared to the conventional wavelength allocation method in which the number of consecutively allocated wavelengths is uniform throughout the signal wavelength band.

Here, a relationship between the wavelength allocation of signal light and the generation amount of four-wave mixed light is described specifically, with reference for example to the localized wavelength allocation diagram in FIG. 10. In the case where, as shown in (A) of FIG. 10, all the signal lights are allocated at equal spacing, the combinations of wavelength numbers which generate four-wave mixed light in the wavelength corresponding to the wavelength number 0 are those as shown in Table 3 below.

TABLE 3

| Four-wave mixed light degeneration | Combination |
| --- | --- |
| Degenerated four-wave mixed light | (−1, 0, 1) |
|  | (0, 1, 2) |
|  | (−2, −1, 0) |
| Non-degenerated four-wave mixed light | (−3, −2, −1, 0) |
|  | (−2, −1, 0, 1) |
|  | (−1, 0, 1, 2) |
|  | (0, 1, 2, 3) |

However, here only the combinations of wavelength numbers including the minimum wavelength spacing are shown. As shown in Table 3 above, for degenerated four-wave mixed light, three combinations of wavelength numbers can be considered, and for non-degenerated four-wave mixed light, four combinations of wavelength numbers can be considered.

On the other hand, when as shown in (B) of FIG. 10, the signal light of three waves are allocated consecutively but the signal light is not allocated on every fourth grid, the combinations of wavelength numbers which generate four-wave mixed light in the wavelength corresponding to the wavelength number 0 are as shown in Table 4 below.

TABLE 4

| Four-wave mixed light degeneration | Combination |
| --- | --- |
| Degenerated four-wave mixed light | (−1, 0, 1) |
| Non-degenerated four-wave mixed light | None |

As shown in Table 4, when the signal lights of three waves are allocated consecutively, there is only one wavelength number combination, for degenerated four-wave mixed light.

Furthermore, as shown in (C) in FIG. 10, when the signal lights of four waves are allocated consecutively but the signal light is not allocated on every fifth grids, the combinations of wavelength numbers which generate four-wave mixed light in the wavelength corresponding to the wavelength number 0 are as shown in Table 5 below,

TABLE 5

| Four-wave mixed light degeneration | Combination |
| --- | --- |
| Degenerated four-wave mixed light | (−1, 0, 1) |
|  | (−2, −1, 0) |
| Non-degenerated four-wave mixed light | (−2, −1, −0, 1) |

As shown in Table 5, when the signal lights of four waves are allocated consecutively, there are only two wavelength number combinations for degenerated four-wave mixed light, and one wavelength number combination for non-degenerated four-wave mixed light.

Therefore, the number of wavelength combinations which generate four-wave mixed light is decreased, the less the consecutively allocated signal lights are, and the generation efficiency of four-wave mixed light is reduced. Accordingly, as with the wavelength allocation of the signal light shown in FIG. 8, by minimizing the number of consecutively allocated signal lights on the short wavelength side where four-wave mixed light is generated easily, and allocating a greater number of signal lights consecutively as the optical signal wavelength is increased, it becomes possible to suppress the four-wave mixing crosstalk amount in each signal light wavelength constant or below, and to secure the greatness possible transmission capacity. Here, it is important that the number of consecutively allocated wavelengths n satisfies the equation (6). The value of n need not necessarily be incremented by one. For example, it is possible that after allocating the signal lights of four waves consecutively, the signal lights of six waves are allocated consecutively.

Figure 8:
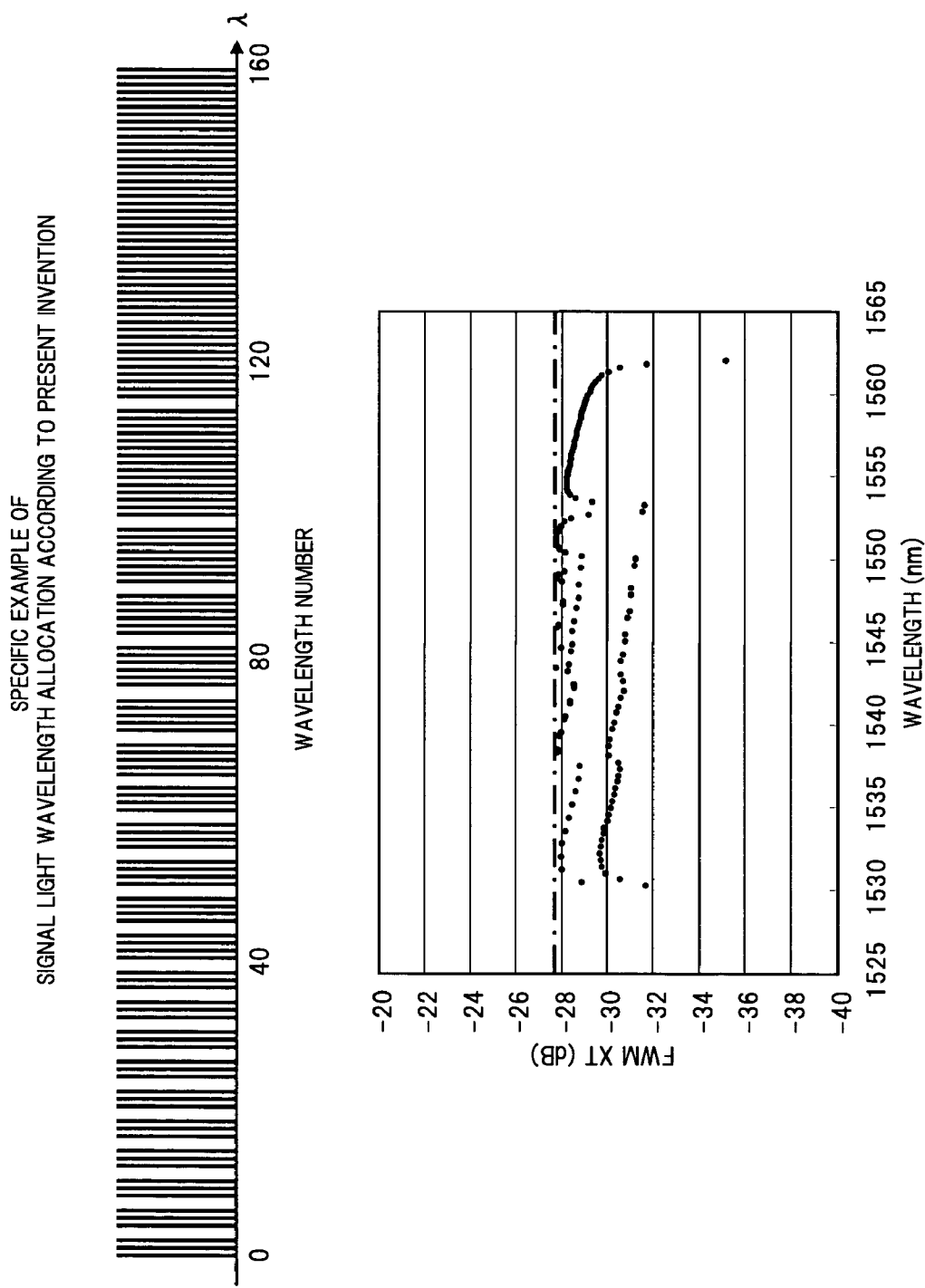
FIG. 8 shows an example of specific wavelength allocation of signal lights determined using the present invention, and four-wave mixing crosstalk amount corresponding thereto.

Specifically, in the example of the wavelength allocation in FIG. 8, the signal lights of 139 waves are allocated on the wavelength grids capable of allocating thereon the signal lights of 160 waves, and the wavelength numbers on which no signal lights are allocated are 4, 8, 12, 16, 20, 24, 28, 32,38, 40, 45, 50, 55, 60, 65, 71, 77, 84, 91, 100 and 116, as indicated by the symbol—under "signal allocation" in Table 1. The results of calculating the numerical value of four-wave mixing crosstalk amount in this case, as shown at the bottom of FIG. 8, become below the tolerance value $\alpha$ (−27.7 dB) for all the wavelengths on which the signal lights of 139 waves are allocated. As a result that the number of allocated signal lights is reduced from 160 waves to 139 waves, although the transmission capacity is reduced by 13%, it becomes possible to obtain an effect in that the maximum amount of four-wave mixing crosstalk is reduced by about 4 dB. This effect of reducing the four-wave mixing crosstalk amount by 4 dB is equivalent to an increase of approximately 2 dB in input optical power to the optical transmission path. Therefore, the transmission distance can be made a maximum of approximately 1.6 times longer.

Figure 12:
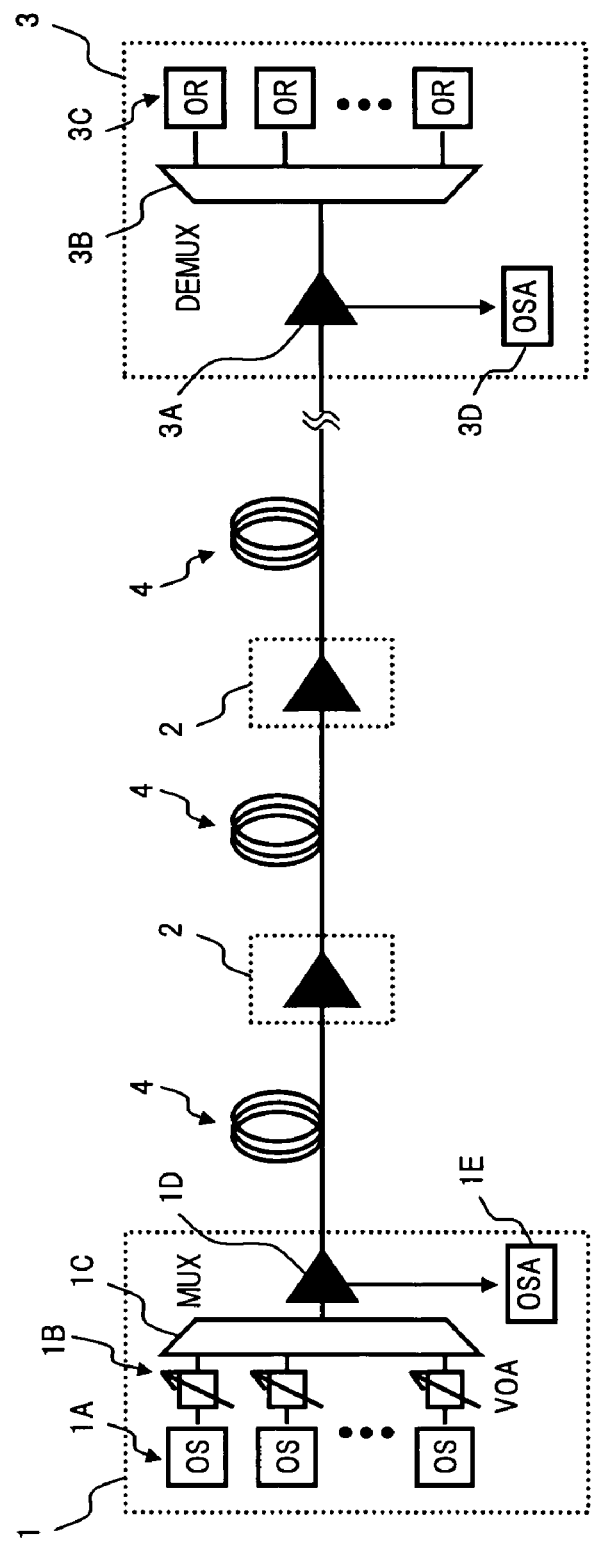
FIG. 12 is a block diagram showing a configuration example of a typical WDM optical transmission system.

According to the wavelength allocation method of signal light according to the present invention as described above, by optimizing according to wavelength bands, the consecutive allocation wavelength number of signal lights to be allocated on the wavelength grids, based on the wavelength dependence of the generation amount of four-wave mixed light, it becomes possible to perform the wavelength allocation of signal light efficiently, while suppressing the four-wave mixing crosstalk amount to a constant value or below allowed by the system. By using such a wavelength allocation method of signal light to determine the wavelength allocation of signal lights transmitted between the optical transmission terminal apparatus 1 and the optical reception terminal apparatus 3, for example in the typical WDM transmission system as shown in FIG. 12, it becomes possible to extend the transmission distance while maintaining the large transmission capacity. Furthermore, in the WDM transmission system mentioned above, it is possible in perform the wavelength allocation of signal lights corresponding to standard wavelength grids such as ITU grids, and basically since it is not necessary to keep the polarization state of signal light constant, a low cost system can also be realized.

Figure 13:
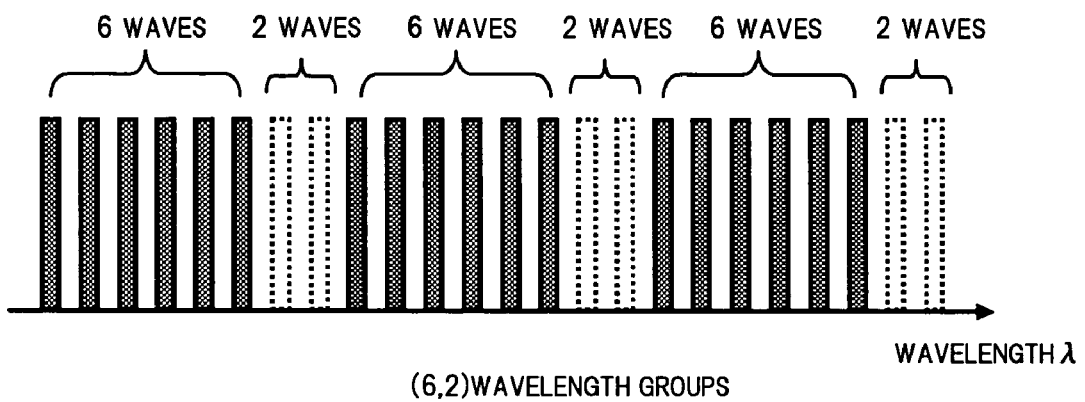
FIG. 13 shows an example of a conventional wavelength allocation method of signal light.

In the above wavelength allocation method of signal light, the specific example has been shown in which the signal light is not allocated on one wavelength grid adjacent to the wavelength grids on which the group of signal lights are allocated consecutively. However, the wavelength allocation method of the present invention can be applied effectively to the wavelength allocation of signal light where it is necessary that the signal lights are not allocated on two or more consecutive wavelength grids as shown in the top part of FIG. 13, for example, in order to perform optical add/drop multiplexing, light level deviation compensation or dispersion slope compensation, of signal lights of a plurality of wavelengths collectively, in an OADM node or optical compensation node.

Figure 11:
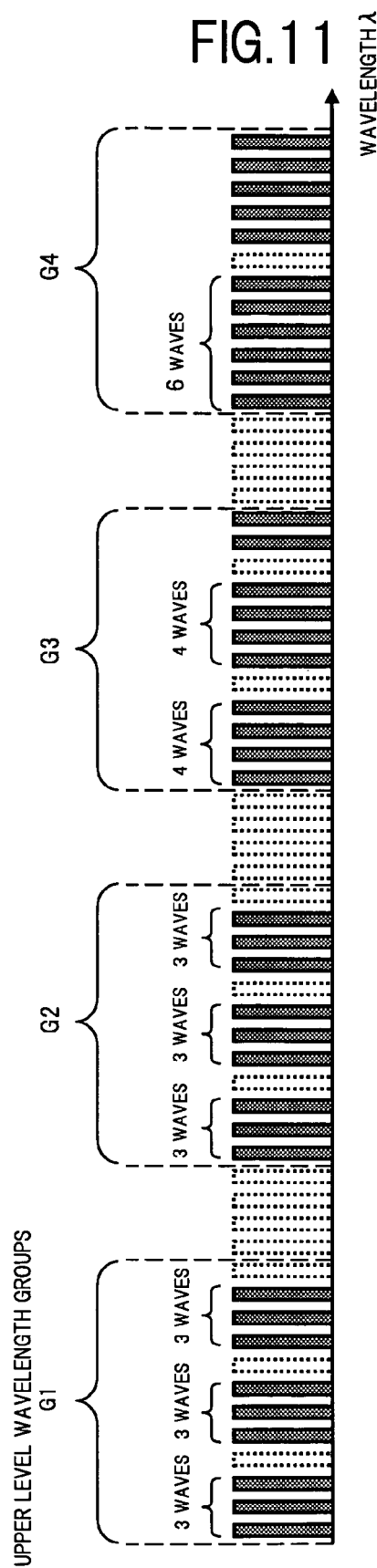
FIG. 11 is a schematic diagram showing an example of wavelength allocation of signal lights corresponding to upper level wavelength groups for the purpose of batch processing in OADM node or optical compensation node.

Specifically, in order to process the signal light of 12 waves collectively in the OADM node or optical compensation node as shown in FIG. 11, for example, then for the wavelength allocation of signal light, applied with (12, 4) wavelength groups where the consecutive wavelength grids for 12 waves and 4 waves are assigned, and the signal lights are allocated on the wavelength grids for 12 waves and the signal lights are not allocated on the wavelength grids for 4 waves, it is possible to apply the present invention to determine the wavelength allocation of signal light to the wavelength grids for 12 channel. Here, if the wavelength groups in which a plurality of signal lights are collectively processed for optical add/drop multiplexing or the like are called "upper level wavelength groups", then in an example in FIG. 11, fur the upper level wavelength groups G1 and G2 on the short wavelength side, (3, 1) wavelength groups are used wherein the signal light of three waves are allocated consecutively, but the signal light is not allocated on one wavelength grid adjacent to the wavelength grids on which the signal lights are allocated consecutively. Furthermore, for the upper level wavelength group G3, (4, 1) wavelength groups are used wherein the signal lights of four waves are allowed consecutively, and for the upper level wavelength group G4, (6, 1) wavelength groups are used wherein the signal lights of six waves are allocated.

By applying such wavelength allocations of signal light, it becomes possible to perform the wavelength allocation of signal light efficiently while suppressing the four-wave mixing crosstalk amount to the tolerance value α or below, even when performing optical add/drop multiplexing, light level deviation compensation or dispersion slope compensation of signal lights of the plurality of wavelengths collectively, in the OADM node or optical compensation node.

What is claimed is:

1. A wavelength allocation method of allocating signal lights on wavelength grids, where previously determined wavelength spacing in the wavelength grids is a base unit, the allocated signal lights being used in wavelength division multiplexing optical transmission in which wavelength division multiplexed signal light obtained by multiplexing signal lights of different wavelengths is transmitted over an optical transmission path, said method comprising:

setting numbers representing how many signal lights to be allocated consecutively in groups of consecutively allocated wavelengths on said wavelength grids; and consecutively allocating the signal lights on said wavelength grids in groups in accordance with the set numbers, wherein at least two groups have different numbers of signal lights, but not allocating a signal light on at least one wavelength of said wavelength grid adjacent to each group of consecutively allocated wavelengths on the wavelength grids, and the numbers representing how many signal lights to be allocated consecutively in groups of consecutively allocated wavelengths are smaller in a short wavelength side than in a long wavelength side of the wavelength grids wherein the numbers representing how many signal lights to be allocated consecutively in groups are set to different values corresponding to wavelength bands so that a four-wave mixing crosstalk calculated for each wavelength corresponding to said wavelength grids is equal to or less than a previously set tolerance value.

2. A wavelength allocation method of signal light according to claim 1, wherein when a plurality of upper level wavelength groups for collectively processing the signal lights of a plurality of wavelengths in an optical node on said optical transmission path, is provided for said wavelength grids, for each signal band on which the signal lights are allocated in each of said upper level wavelength groups, the signal lights are allocated consecutively on the wavelength grids within said signal bands, in accordance with the numbers determined based on the wavelength dependence of said generation amount of four-wave mixed light, but the signal light is not allocated on at least one wavelength grid adjacent to the wavelength grids on which said group of signal lights are allocated consecutively.

3. A wavelength allocation method of signal light according to claim 2, wherein said optical node is at least one of an optical add/drop multiplexing node and an optical compensation node.

4. A wavelength allocation method of signal light according to claim 1, wherein said wavelength grid is equally spaced.

5. A wavelength allocation method of signal light according to claim 4, wherein said equal spacing is 25 GHz.

6. A wavelength allocation method of signal lights on wavelength grids, where previously determined wavelength spacing in the wavelength grids is a base unit, the allocated signal lights being used in wavelength division multiplexing optical transmission in which wavelength division multiplexed signal light obtained by multiplexing signal lights of different wavelengths is transmitted over an optical transmission path, said method comprising:

setting numbers representing how many signal lights to be allocated consecutively in groups of consecutively allocated wavelengths on said wavelength grids;

consecutively allocating the signal lights on said wavelength grids in groups in accordance with the set numbers, setting a tolerance value a for the amount of four-wave mixing crosstalk;

calculating power in the optical transmission path for signal light of each wavelength corresponding to said wavelength grid;

obtaining a four-wave mixing crosstalk amount $\beta_i$ (i =wavelength number) corresponding to each wavelength for when the signal lights are allocated on all wavelengths corresponding to said wavelength grids, based on results of calculating the power in said optical transmission path, and also obtaining a four-wave mixing crosstalk amount $Y_{n\_1}$ corresponding to each wavelength for when the signal lights of n waves (where n is an integer of 2 or more) are allocated consecutively on said wavelength grid;

calculating a difference $C_n$ between said four-wave mixing crosstalk amounts $\beta_i$ and $Y_{n\_1}$ corresponding to the consecutive allocation wavelength number n;

obtaining the consecutive allocation wavelength number n(i) which satisfies a relationship $C_{n+1} < \beta_i - \alpha < C_n$ for the wavelengths where said four-wave mixing crosstalk amount $\alpha_i$ exceeds said tolerance value $\alpha$; and determining whether or not to allocate the signal light on each wavelength corresponding to said wavelength grid, in accordance with said numbers n(i), wherein the numbers representing how many signal lights to be allocated consecutively in groups are set to different values corresponding to wavelength bands so that a four-wave mixing crosstalk amount calculated for each wavelength corresponding to said wavelength grids is equal to or less than a previously set tolerance value, and at least two groups have different numbers of signal lights, but not allocating a signal light on at least one wavelength of said wavelength grid adjacent to each group of consecutively allocated wavelengths on the wavelength grids.

7. A wavelength allocation method of signal light according to claim 6, wherein the power in said optical transmission path for said signal light of each wavelength is calculated based on input optical power to said optical transmission path and stimulated Raman scattering occurring in said optical transmission path.

8. An optical transmission apparatus for transmitting wavelength division multiplexed signal light obtained by multiplexing a plurality of signal lights of different wavelengths transmitted over an optical transmission path, comprising:

a device which allocates signal lights on a wavelength grid having a previously determined wavelength spacing as a base unit, different numbers being set in advance to represent how many signal lights are allocated consecutively in wavelength bands of the wavelength grid, but does not allocate any signal light on at least one wavelength grid adjacent to any wavelength band in which signal lights are consecutively allocated, and performing at least one of transmission and reception of wavelength division multiplexed signal light after allocating signal lights on the wavelength grid, wherein at least two wavelength bands have different numbers of consecutively allocated wavelengths of the wavelength grid to signal lights, and the numbers representing how many signal lights to be allocated consecutively in groups of consecutively allocated wavelengths are smaller in a short wavelength side than in a long wavelength side of the wavelength grid wherein the numbers representing how many signal lights to be allocated consecutively in groups are set to different values corresponding to wavelength bands so that a four-wave mixing crosstalk calculated for each wavelength corresponding to said wavelength grids is equal to or less than a previously set tolerance value.

9. A wavelength division multiplexing optical transmission system comprising:

an optical transmission apparatus according to claim 8, wherein wavelength division multiplexed signal light is transmitted via an optical transmission path.

10. A wavelength allocation method usable for transmitting a multiplexed optical signal, comprising:

allocating consecutive wavelengths of an equally spaced wavelength grid, to groups of signals, predetermined numbers representing how many consecutive wavelengths of the equally spaced wavelength grid are allocated to signals in each group, each group including at least three signals, leaving at least one wavelength of the equally spaced wavelength grid unused between adjacent groups, and at least two groups having different predetermined numbers of signals, wherein all the groups of signals are multiplexed to be transmitted, and the predetermined numbers representing how many signal lights to be allocated consecutively in groups of consecutively allocated wavelengths are smaller in a short wavelength side than in a long wavelength side of the equally spaced wavelength grid wherein the numbers representing how many signal lights to be allocated consecutively in groups are set to different values corresponding to wavelength bands so that a four-wave mixing crosstalk calculated for each wavelength corresponding to said wavelength grids is equal to or less than a previously set tolerance value.

\* \* \* \* \*